UNITED STATES PATENT OFFICE.

WILHELM HIRSCHKIND, OF PITTSBURG, CALIFORNIA, ASSIGNOR TO CALIFORNIA ALKALI COMPANY, OF SAN FRANCISCO, CALIFORNIA, A CORPORATION OF CALIFORNIA.

PROCESS FOR THE RECOVERY OR PURIFICATION OF POTASSIUM SALTS.

1,343,508. Specification of Letters Patent. Patented June 15, 1920.

No Drawing. Application filed April 8, 1918. Serial No. 227,317.

*To all whom it may concern:*

Be it known that I, WILHELM HIRSCHKIND, a subject of the King of Bavaria, and a resident of Pittsburg, county of Contra Costa, State of California, have invented certain new and useful Improvements in Processes for the Recovery or Purification of Potassium Salts, of which the following is a specification.

My invention relates to the recovery or purification of potassium salts, and more particularly to the recovery of potassium chlorid from natural brines or mixtures containing potassium chlorid and boracic compounds, with or without other salts. Potassium salts, more particularly potassium chlorid occur in many natural waters such as those of Searles Lake, Owens Lake, and Mono Lake, in California, together with salts of boracic acid such as borax.

This application is a continuation in part of my prior application Ser. No. 175792 filed June 20, 1917.

The invention is especially useful in the recovery of potassium chlorid purified of borax or boracic compounds, from brines or saline liquors containing these ingredients, such for example as the brines of the aforesaid lakes.

Of course, the invention may be used to purify potassium salts containing boracic compounds, to free it of the borax, no matter how the impure potassium salts are obtained. It may also be an object to obtain certain of the other salts, including borax, the invention not being specifically limited to obtaining potassium chlorid only.

The processes which have hitherto been used for the preparation of potassium salts free from boracic compounds have been tedious and expensive; various attempts having been made to separate them in the state in which they occur. I have discovered that by converting one of these constituents, leaving the other unaffected, into a form in which it is capable of ready solution while the other constituent remains insoluble, the converted constituent can be readily separated.

In other words, my invention broadly comprehends the practical treatment of mixtures containing potassium salts and borax so as to convert one of the components into a form which is amenable to a selective solvent agent, and then recovering the dissolved constituent which had been so converted. My process is particularly directed to the removal of the boracic ingredient by simple and inexpensive means.

More especially I have discovered that by treating the impure potassium salt (one having the boracic compound mixed therewith) with an acid or an acidic substance, such for example as sulfur dioxid, or chlorin, to liberate the boracic acid in the free state, and then treating the resulting potassium salt obtained from this liquid and now containing boracic acid, with a solvent, which has a selective solvent action upon boracic acid and potassium chlorid—a solvent such for example as certain alcohols, ethyl or methyl alcohol, the boracic acid dissolves, leaving the potassium salt free from boracic acid.

The alcoholic solution may then be recovered for further use, by distilling it, preferably after adding an alkali such as soda or lime, to combine with the boracic acid contained.

In carrying out my process, I may operate upon the impure potassium salt prepared by known means or I may use the natural waters.

I.

In the latter case, I prefer to evaporate the water to such a degree as will produce a separation of the major part of the carbonate and bicarbonate of sodium and of the sodium chlorid and sulfate generally contained in such waters. This may generally be accomplished by evaporating the water to a certain concentration and treating it with carbonic acid gas for the separation of the bicarbonate of sodium. This treatment of the liquor with carbonic acid gas—*i. e.*, carbon dioxid, will transform the carbonate to an insoluble bicarbonate from which the liquor is removed. This is followed by further evaporation to separate sodium chlorid and sulfate. In case the sodium carbonate has not been sufficiently removed by the first treatment with carbonic acid gas, there may be a second treatment of the liquor, (now further concentrated) with carbonic acid gas (*i. e.*, carbon dioxid) to remove further sodium carbonate. The said further or second evaporation can be done by solar heat and subsequent boiling, or by boiling alone until the saturation point of potassium chlorid in that solution at ordinary temperature is reached.

Different modes of procedure are desirable in the next steps, depending upon whether the proportion of boracic compounds as compared with the potassium compounds is large or small. The hot liquor separated from common salt and sulfate and saturated with potassium chlorid at ordinary temperature, may in case the proportion of borax is large, be allowed to cool and deposit crystals of borax.

II.

In case the proportion of borax is so small that the concentrated liquor obtained at this point will not deposit pure borax, the liquor may be treated directly with an acid, for example, hydrochloric acid, which will separate the boracic acid from the sodium with which it has been combined. When the proportion of borax is large, the mother liquor remaining after the crystallization of the borax, is treated with acid in the same manner as just described. Instead of hydrochloric acid, any chemical may be used which will liberate the boracic acid; for example, sulfuric acid, acetic acid, chlorin or sulfur dioxid.

In some cases it may be desirable to carry the concentration of this liquor (before adding the acid which is to liberate the boracic acid) to the point of saturation of potassium chlorid at the temperature employed and then to cool the liquor whereby crystals of potassium chlorid and borax separate from the solution (which solution is returned to an original liquor being treated), and then to redissolve these crystals in water, the resulting solution being then treated with an acid.

III.

The solution now containing the potassium salt as well as the free boracic acid, is now evaporated so as to obtain a concentrated solution from which potassium salts will crystallize out on cooling; the solid potassium salts obtained, being contaminated with some boracic acid.

IV.

The solid crystals thus produced are now treated with an alcohol, such for example as methyl or ethyl alcohol, until the boracic acid is completely removed. Other impurities contained in the potassium salts such as sodium chlorid, may be removed by leaching with cold water.

Instead of conducting the evaporation in such a way as to produce a solid mixture of potassium salt and boracic acid, the solution may in some cases be evaporated to a concentrated state and the alcohol added to this solution in such amount as to completely dissolve the boracic acid and leave the major part of potassium salt undissolved.

V.

The alcololic solution containing the boracic acid may then be recovered for further use by distilling it, preferably with the addition of some alkaline substance, such as soda or lime.

While I have described my invention according to the preferred manner of practising the same, it will be obvious to those skilled in the art, after having understood my invention, that certain steps or phases of the complete process described may be utilized without utilizing the whole process described, according to the work to be accomplished, and that certain substitutions and changes may be made in certain phases of the process without departing from the spirit or scope of my invention and discovery.

Having thus described my invention, what I claim as new and desire to secure by Letters Patent, is:—

1. The process of separating from a mixture containing potassium salts and boracic acid, the potassium salts, which comprises treating the mixture with an alcohol to extract the boracic acid.

2. The process of separating boracic acid from impure potassium chlorid containing boracic acid, which comprises treating the potassium chlorid with an alcohol for the removal of the boracic acid.

3. The process of purifying potassium chlorid from boracic acid, which comprises treating the solid potassium chlorid containing boracic acid with an alcohol for the removal of the boracic acid.

4. The process of purifying potassium chlorid contaminated with boracic acid and one or more water soluble salts, which comprises treating the potassium chlorid with an alcohol for the removal of boracic acid, and then leaching with water the potassium chlorid crystals remaining to dissolve out any water soluble salts.

5. The process of separating, out of a mixture containing a potassium salt and a boracic compound, the potassium salt, which comprises treating the mixture with a reagent that will liberate boracic acid from its salts in a free state, separating from the solution a mixture containing boracic acid and potassium salt, and treating the separated mixture, containing boracic acid and potassium salt, with a solvent that will extract the boracic acid but which has little or no affinity for the potassium salt.

6. The process of separating out of a mixture containing potassium chlorid and sodium borate, the potassium chlorid, which comprises treating the mixture in solution with a reagent which will liberate the boracic acid from its previous combination, and then recovering, in solid form from the solution, the potassium chlorid mixed with boracic acid, and treating the recovered mixture, containing the potassium chlorid and boracic acid, with a solvent that will combine with the boracic acid but which has little or no affinity for the potassium chlorid.

7. The process of separating out of a mixture containing a potassium salt and a boracic compound, the potassium salt, which comprises treating the mixture with a suitable acidic substance to liberate the boracic acid from its previous combination, separating from the solution a mixture containing boracic acid and potassium salt, and treating the separated mixture, containing boracic acid and potassium salt, with an alcohol to extract the boracic acid.

8. The process of recovering potassium salts from waters, which consists in separating from them an impure potassium salt containing boracic acid or its combinations, treating the impure salt to liberate the boracic acid in the free state and extracting the boracic acid with an alcohol.

9. The process of purifying potassium salts, which comprises treating the impure potassium salts with an acid or acidic substance to free the boracic acid contained in it from its compounds, and removing the boracic acid by treating the impure potassium salt with an alcohol.

10. The process of purifying potassium salts of sodium borate, which comprises treating the mixture in solution with a reagent which will liberate the boracic acid from its salts in a free state, separating the mixture of the boracic acid and potassium salt from the solution, and treating the separated mixture with an alcohol to separate the boracic acid.

11. The process of purifying potassium salts of boracic acid which comprises treating the impure salts with an alcohol separating the alcoholic solution and recovering the alcohol by distillation.

12. The process of recovering potassium salts from waters containing sodium carbonate and boracic compounds, which comprises treating the waters at a suitable degree of concentration with carbonic acid, separating the sodium bicarbonate formed, evaporating the water for the separation of crystals of impure potassium salt and treating the impure potassium salt with an acid or acidic substance to liberate the boracic acid contained in it from its combination and removing the boracic acid by treatment with an alcohol.

13. The process of recovering potassium salts from brines containing such salts as sodium carbonate, sodium sulfate, boracic compounds and potassium salts, which comprises treating the somewhat concentrated brine with carbonic acid gas for the separation of the sodium carbonate, heating the remaining solution for the separation of the sodium chlorid, cooling the remaining solution for the separation by deposit of sodium borate, treating the remaining solution with an acidic substance to separate the boracic acid in a free state, recovering in solid form the potassium salts mixed with boracic acid, and then treating the crystals with a solvent that will extract the boracic acid from said solid salts.

14. The herein described method of obtaining potassium chlorid from waters containing the same and sodium borate and other salts, embodying first partially eliminating the salts other than the potassium chlorid and sodium borate so as to obtain a solution high in the chlorid and borate, treating the solution with an acidifying agent to form boric acid, depositing the chlorid and acid from the solution, and separating the boric acid thus formed by dissolving in alcohol.

15. The herein described method of obtaining potassium chlorid from waters containing the same and sodium borate, sodium chlorid and other salts, embodying first eliminating the other salts and concentrating to obtain a solution high in the three named salts, treating the solution with an acidifying agent to form boric acid, concentrating the solution by heat to deposit the named salts and acid, treating the mixed salts with alcohol to dissolve the boric acid formed and separating the solution thus formed, and washing out the sodium chlorid from the remaining mixture of sodium chlorid and potassium chlorid with clear cold water, leaving the potassium chlorid.

16. The herein described method of obtaining potassium chlorid from waters containing the same and sodium borate and other salts, embodying first partially eliminating the salts other than the potassium chlorid and sodium borate so as to obtain a solution high in the chlorid and borate, concentrating the solution by evaporation, depositing the chlorid and borate by cooling the concentrated solution, separating the mother liquor from the deposited salts and redissolving the salts in clear water, treating the solution with an acidifying agent to form boric acid, depositing the chlorid and acid from the solution, and separating the boric acid thus formed by dissolving in alcohol.

17. The herein described method of obtaining potassium chlorid from waters containing the same and sodium borate, sodium chlorid and other salts, embodying first eliminating the other salts and concentrating to obtain a solution high in the three named salts, concentrating the solution by evaporation, cooling the concentrated solution to deposit the named salts, separating the liquor from the deposited salts and redissolving the salts in clear water, treating the solution with an acidifying agent to form boric acid, concentrating the solution by evaporation to deposit the named salts and acid, separating and treating the deposited acid and salts with alcohol to dissolve the boric acid formed, and separating the solution thus formed, and washing out the sodium chlorid from the remaining mixture of sodium chlorid and potassium chlorid with clear cold water, leaving the potassium chlorid.

18. The herein described method of treating waters containing potassium chlorid, sodium borate, sodium sulfate, sodium carbonate, and sodium chlorid, embodying first concentrating by evaporation to remove part of the sodium chlorid, sodium carbonte and sodium sulfate to obtain a solution strong in sodium borate and potassium chlorid, the concentration being proceeded with to the saturation point of potassium chlorid at the temperature employed, removing the liquor from the deposited salts, then treating the solution with an acidifying reagent to form boric acid, then concentrating the liquor to deposit the contained salts and acid, separating and treating the mixed salts and acid with alcohol to dissolve the boric acid, removing the solution, and washing out the remaining salts with clear cold water leaving the potassium chlorid undissolved.

19. The herein described method of treating waters containing potassium chlorid, sodium borate, sodium sulfate, sodium carbonate, and sodium chlorid, embodying first concentrating by evaporation to remove part of the sodium chlorid, sodium carbonte and sodium sulfate to obtain a solution relatively strong in sodium borate and potassium chlorid, the concentration being proceeded with to the saturation point of potassium chlorid at the temperature employed in evaporating, removing the liquor from the deposited salts, depositing the salts from the liquor by cooling, removing the liquor from the deposited salts, redissolving the deposited salts in clear water sufficient to make a solution; then treating the solution with an acidifying reagent to form boric acid, then concentrating the liquor to deposit the contained salts and acid, removing and treating the mixed salts and acid with alcohol to dissolve the boric acid, removing the solution from the remaining salts, and washing out the remaining salts with clear cold water leaving the potassium chlorid undissolved.

20. The herein described method of treating waters containing potassium chlorid, sodium borate, sodium sulfate, sodium carbonate, and sodium chlorid, embodying first concentrating by evaporation to remove part of the sodium chlorid, sodium carbonate and sodium sulfate to obtain a solution relatively strong in sodium borate and potassium chlorid, cooling to deposit a portion of the sodium borate, removing the liquor and proceeding with the concentrating to the saturation point of potassium chlorid at the temperature employed, removing the liquor from the deposited salts, depositing the salts from the liquor by cooling, removing the liquor from the deposited salts, redissolving the deposited salts in clear water sufficient to make a solution; then treating the solution with an acidifying reagent to form boric acid, then concentrating the liquor by evaporation to deposit the contained salts and acid, removing and treating the mixed salts and acid with alcohol to dissolve the boric acid, removing the solution from the remaining salts, and washing out the remaining salts with clear cold water leaving the potassium chlorid undissolved.

21. The herein described process of treating waters containing potassium chlorid, sodium borate, sodium sulfate, sodium carbonate, and sodium chlorid, embodying first treating the liquor with carbon dioxid to transform the carbonate to an insoluble bicarbonate and removing the liquor therefrom, then heating and evaporating the liquor to concentrate it to the saturation point of potassium chlorid at ordinary temperatures, then treating the liquor further with carbon dioxid to remove further sodium carbonate and then cooling to deposit sodium borate and removing the liquor, then further concentrating the liquor by evaporation to the saturation point of potassium chlorid at the temperature employed, then cooling the liquor to deposit the contained salts, removing the liquor to be returned to an original liquor being treated, re-dissolving the mixed salts in clear water, treating the solution with chlorin to form boric acid and sodium chlorid from the sodium borate, concentrating the solution and depositing the salts and boric acid therefrom, removing and treating the mixed deposit with alcohol to dissolve the boric acid and removing the solution, and washing out the salts with clear cold water leaving undissolved the potassium chlorid.

In testimony whereof, I have signed my name to this specification.

WILHELM HIRSCHKIND